No. 608,977. Patented Aug. 9, 1898.
W. J. ELLIOTT.
FRICTION CLUTCH.
(Application filed Dec. 3, 1897.)
(No Model.) 2 Sheets—Sheet 1.
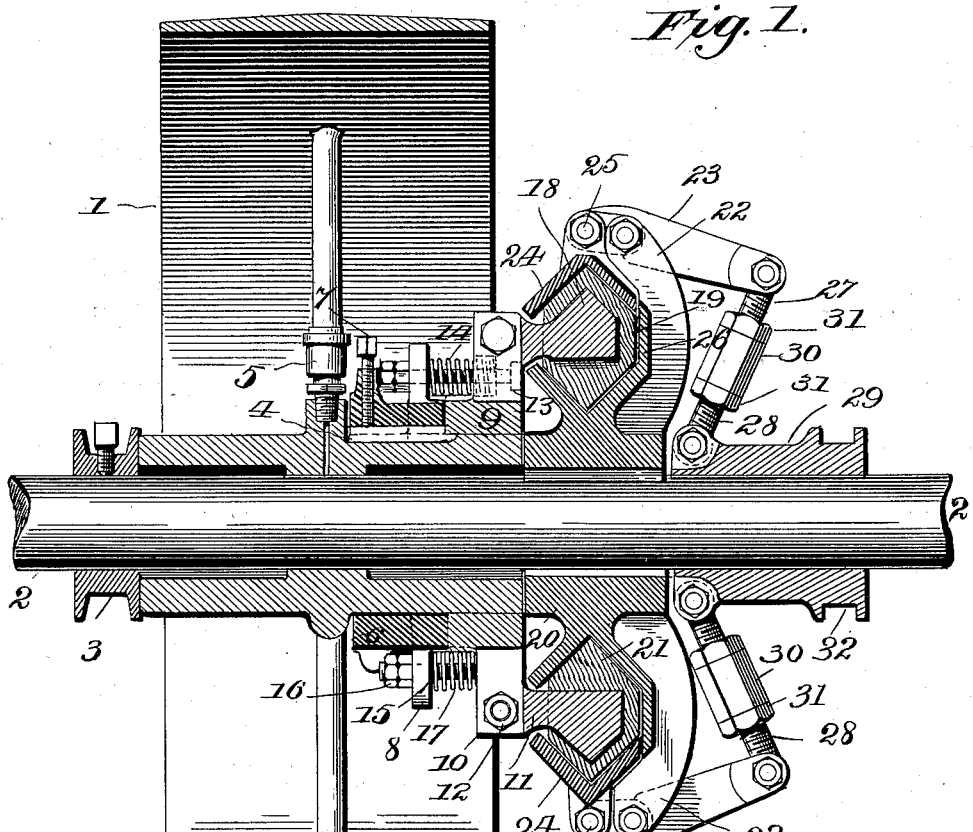
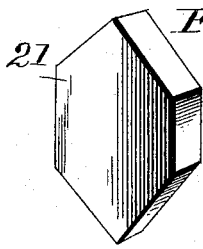
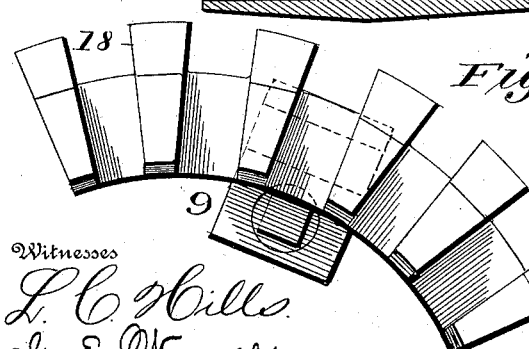

No. 608,977. Patented Aug. 9, 1898.
W. J. ELLIOTT.
FRICTION CLUTCH.
(Application filed Dec. 3, 1897.)
(No Model.) 2 Sheets—Sheet 2.

Witnesses
L. C. Mills
G. E. Warner

Inventor
William J. Elliott
By Glascock & Co.
Attorneys

UNITED STATES PATENT OFFICE.

WILLIAM J. ELLIOTT, OF WILMINGTON, DELAWARE, ASSIGNOR OF ONE-HALF TO V. C. WALKER AND R. T. ELLIOTT, OF SAME PLACE.

FRICTION-CLUTCH.

SPECIFICATION forming part of Letters Patent No. 608,977, dated August 9, 1898.

Application filed December 3, 1897. Serial No. 660,702. (No model.)

*To all whom it may concern:*

Be it known that I, WILLIAM J. ELLIOTT, a citizen of the United States, residing at Wilmington, in the county of New Castle and State of Delaware, have invented certain new and useful Improvements in Friction-Clutches; and I do hereby declare the following to be a full, clear, and exact description of the invention, such as will enable others skilled in the art to which it appertains to make and use the same.

My invention has relation to friction-clutches; and it consists in the novel construction and arrangement of its parts, as hereinafter described.

The object of the invention is to provide a clutch simple in its construction and adapted to be easily and readily fitted on the hub of the pulley.

A further object of the invention is to provide a number of arms pivotally mounted on the hub of the pulley, a spring bearing against the shaft of each arm and tending to keep the outer end of the arm in an elevated position, each arm being provided with a quadrant-shaped projection, with lugs located at intervals thereon, and a number of wooden friction-blocks located on each projection and held between the lugs.

A collar is attached to the shaft, said collar having a circumferential V-shaped groove adapted to receive the inner portions of the wooden friction-blocks. The collar is provided with a number of radially-extending arms, to the outer ends of which are fulcrumed levers, said levers carrying at one end V-shaped quadrants pivotally attached thereto. The V-shaped quadrants last mentioned are adapted to come in contact with the outer ends of the friction-blocks when the levers are operated.

A shifting spool is located on the shaft, said spool being adapted to be operated by an ordinary lever, said spool being connected with the levers of the V-shaped quadrants, and as the spool is shifted the levers are operated, and thus frictional contact is made with the friction-blocks.

Figure 2:
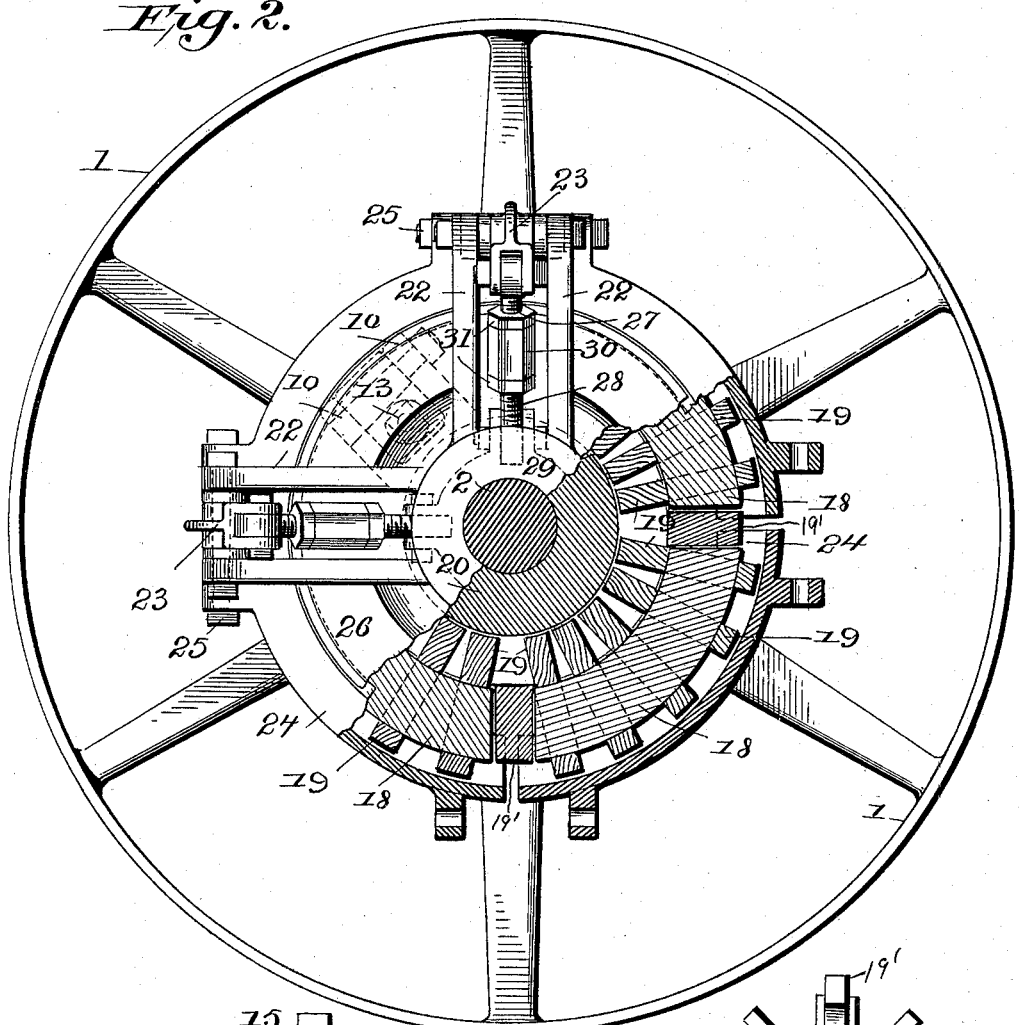
Figure 5:
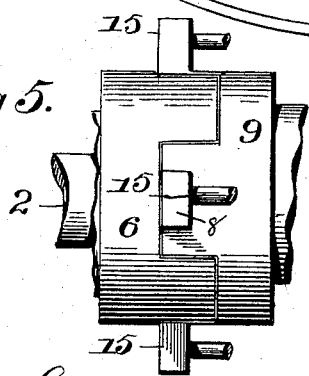
Figure 6:
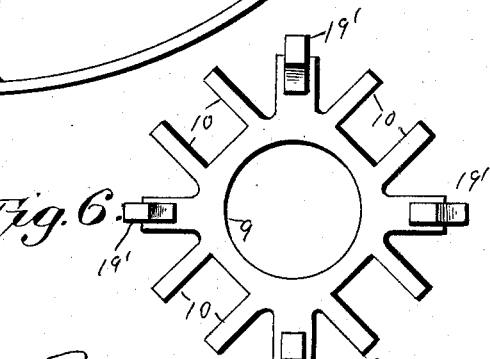

In the accompanying drawings, Figure 1 is a transverse sectional view of the pulley-wheel and friction-clutch, showing the parts located on the shaft. Fig. 2 is a side elevation of the wheel and the clutch, the clutch being partly in section. Fig. 3 is a plan view. One of the arms have quadrant extensions and lugs located at intervals thereon. Fig. 4 is a perspective view of one of the friction-blocks. Fig. 5 is a side elevation showing the manner of attaching the collar on the hub of the pulley-wheel to the ring. Fig. 6 is a side elevation of the ring.

The wheel 1 is loosely mounted on the shaft 2. The wheel is prevented from moving longitudinally away from the clutch by means of the fixed collar 3. The hub of the wheel is provided with a key 4, said key extending parallel with the transverse axis of the wheel. A suitable oil-cup 5 is located on the hub of the wheel 1. A collar 6 surrounds the hub of the wheel 1, and said collar is secured in position by means of a set-screw 7. The inner end of said set-screw engages the key 4, as shown in Fig. 1. The ring 8 also surrounds the hub of the wheel and bears laterally against the collar 6 and engages the collar 6 and is attached thereto. The ring 9 is provided on its periphery with four sets of radially-extending lugs 10, and the horizontal arms 11 are pivotally connected to the lugs 10 by means of the bolts 12, the inwardly-extending shanks 13 of the arms 11 passing between the lugs 10, forming a set. A pin 14 passes through a suitable perforation in each shank 13, the opposite ends of the said pins 14 passing through the perforated lugs 15 of the ring 8. On the extreme ends of the pins 14 the jam-nuts 16 are located. A coiled spring 17 is interposed between the protrusions 15 and the shanks 13, the said coil-spring surrounding the pins 14, as shown in Fig. 1. The coil-springs 14 are under a tension, and they tend to keep the inner ends of the shanks 13 as far as possible to the front—that is, as far as the pins 14 will permit. The ends of the arms 11 are provided with the quadrant-shaped extensions 18, the said extensions extending at right angles to the horizontal axis of the arms 11, and the inverted-V-shaped lugs 18' are located at intervals on the extensions 18, as shown in Fig. 3.

There are four quadrant extensions 18 provided, the said extensions substantially forming a circle, there being, however, a slight space left between the end of each extension and the end of the adjoining extension. The wooden blocks 19 are located in the spaces between the lugs 18' on the extensions 18. Said blocks 19 at their upper and lower ends are V-shaped. At the ends of the extensions 18 the lugs 19' are interposed, said lugs being supported by the ring 9, as shown in Fig. 6. The collar 20 is keyed to the shaft 2. The said collar is provided with a circumferential V-shaped groove 21, and at regular intervals the said collar is provided with the radially-extending arms 22, the said arms 22 being arranged in pairs. A lever 23 is journaled between the outer ends of each pair of arms 22, and each lever 23 is provided with a quadrant 24, each quadrant having an inner surface in substantially the shape of an inverted V. The quadrants 24 are pivotally attached, by means of the bolts 25, to the ends of the levers 23. The inner V-shaped surfaces of the quadrants 24 are adapted to come in contact with the outer ends of the blocks 19, as will be hereinafter explained.

The collar 20 is provided with the annular wall 26, the said wall extending beyond the edges of the quadrants 24, and thus it will be seen that the blocks 19 are completely housed between the collar 20 and the quadrants 24, and thus the said blocks are protected from dust, &c. The threaded pins 27 are pivotally attached to the outer ends of the levers 23, and the threaded pins 28 are pivotally attached to the spool 29, the said spool 29 being adapted to shift laterally on the shaft 2. An internally-threaded nut 30 engages the threads of the pins 27 and 28 and connects the said pins, the said nut providing a means for adjusting the connection between the spool 29 and the outer ends of the levers 23. The jam-nuts 31 are provided at each end of the nut 30 and are adapted to prevent the nut 30 from revolving when adjusted to its proper position on the pins 28 and 29. The outer end of the spool 29 is provided with an annular recess 32, said recess being adapted to receive the upper end of the lever, whereby the spool 29 may be moved laterally on the shaft 2.

Having thus described the construction of the device, its operation is as follows: It is presumed that a belt is traveling around the pulley 1 and that the said pulley is loosely mounted on the shaft 2. When the operator desires to make the pulley 1 fast to the shaft 2 and thus revolve the shaft, the lever, (not shown in the drawings,) entering the recess 32 of the spool 29, is moved to the right. Thus the said spool 29 is moved to the right and the pins 27 and 28 are moved to the right just beyond a perpendicular. This forces the outer ends of the levers 23 away and the inner ends of the said levers toward the shaft 2. The inner surfaces of the quadrants 24 come in contact with the upper ends of the blocks 19, and the quadrant extensions 18 of the arms 11 are depressed, the coil-springs 14 compensating for such depression, and the lower ends of the blocks 19 are forced into contact with the circumferential V-shaped groove of the collar 20, the said collar 20 being made fast to the shaft and the arms 11 being made fast to the hub of the pulley 1. A frictional contact is thus established between the pulley and the shaft and the shaft 2 is given the revolution of the pulley. To disconnect the pulley from the shaft, the spool 29 is moved to the left and the operation above described is reversed. When the quadrants 24 disengage the outer ends of the blocks 19, the tension of the coil-springs forces the shanks 13 of the arms 11 out. Thus the said arms 11 are elevated and the lower ends of the blocks 19 are carried away from the circumferential V-shaped groove of the collar 20, the jam-nuts 16 of the pins 17 having been so adjusted as to prevent the upper ends of the blocks 19 from coming in contact with the quadrants 24, and thus there is no frictional contact whatever between the parts of the clutch located on the wheel-hub and the parts located on the shaft.

Having thus described my invention, what I claim as new, and desire to secure by Letters Patent, is—

1. In combination with a shaft and a pulley, a number of arms pivotally mounted on the pulley, a spring engaging each arm, quadrant extensions located on each arm, blocks carried by said extensions, a collar attached to the shaft, said collar having a circumferential friction-surface, levers fulcrumed to said collar, said levers having at their ends friction-surfaces, a suitable means for operating the levers and causing the friction-surfaces located thereon to impinge the blocks against the friction-surface of the collar.

2. In combination with a pulley and a shaft, a friction-clutch consisting of arms pivotally attached to the pulley, said arms having shanks extending at an angle, springs bearing at one end against the shanks and at the opposite end against a stationary point, quadrant extensions located on said arms, blocks carried by said extensions, a collar fixed to the shaft, said collar having a circumferential friction-surface, levers fulcrumed to said collar, said levers having at their ends friction-surfaces, a suitable means for operating said levers and causing the friction-surfaces thereof to impinge the blocks against the circumferential friction-surface of the collar.

3. In combination with a pulley and a shaft, a friction-clutch consisting of a collar attached to the hub of the pulley, arms pivotally connected to said collar, springs bearing against said arms and retaining them in their normal positions, quadrant extensions located on said arms, blocks carried by said extensions, a collar fixed to the shaft, said collar having a circumferential friction-surface, levers fulcrumed to said collar, said levers having at their ends friction-surfaces, a suitable means for operating the said levers and causing the friction-surfaces thereof to impinge the blocks against the circumferential friction-surface of the collar attached to the shaft.

4. In combination with a pulley and a shaft, a friction-clutch consisting of a collar adapted to be secured to the hub of the pulley, a means for laterally adjusting the position of said collar, arms pivotally attached to said collar, springs bearing against said arms and retaining them in their normal positions, quadrant extensions located on said arms, friction-blocks carried by said extensions, a collar fixed to the shaft, said collar having a circumferential friction-surface, levers fulcrumed to said collar, said levers having at their ends friction-surfaces, means for operating the levers and causing the friction-surfaces carried thereby to impinge the blocks against the circumferential friction-surface of the collar attached to the shaft.

5. In combination with a pulley and a shaft, a friction-clutch consisting of a collar attached to the hub of the pulley, arms pivotally attached to said collar, pins passing through perforations of the arms and through perforations located on the hub, coil-springs surrounding said pins and bearing at one end against a stationary point and at the other end against the arms, quadrant extensions carried by said arms, blocks carried by said extensions, a collar fixed to the shaft, said collar having a circumferential friction-surface, levers fulcrumed to said collar, said levers having friction-surfaces, a suitable means for operating the levers and causing the friction-surfaces carried thereby to impinge the blocks against the circumferential friction-surface of the collar attached to the shaft.

6. In combination with a shaft and a pulley, a friction-clutch consisting of a collar attached to the hub of the pulley, arms pivotally attached to said collar, pins passing through perforations of said arms and through perforated lugs supported by the hub, nuts located behind said lugs and adapted to regulate the length of the pins, coil-springs surrounding the pins and bearing at one end against the arms and at the other end against a stationary point, quadrant extensions located on said arms, blocks carried by said extensions, a collar fixed to the shaft, said collar having a circumferential friction-surface, levers pivoted to said collar, having friction-surfaces, a suitable means for operating the levers and adapted to cause the friction-surfaces carried thereby to impinge the blocks against the circumferential friction-surface of the collar attached to the shaft.

7. In combination with a shaft and a pulley, a friction-clutch consisting of arms attached to the pulley, friction-blocks carried by said arms, said friction-blocks being substantially V-shaped at their upper and lower ends a collar fixed to the shaft, said collar having a circumferential V-shaped friction-surface, levers fulcrumed to said collar, said levers having V-shaped friction-surfaces, a suitable means for operating the levers and causing the friction-surfaces thereof to impinge the blocks against the circumferential friction-surface of the fixed collar.

8. In combination with a shaft and a pulley, a friction-clutch consisting of arms attached to the pulley, friction-blocks located on said arms, a collar fixed to the shaft, said collar having a circumferential friction-surface, and an annular perpendicular wall, levers fulcrumed to said collar, said levers having friction-surfaces, said friction-surfaces extending to the inner face of the wall of the fixed collar, a suitable means for operating the levers and causing the friction-surfaces carried thereby to impinge the blocks against the circumferential friction-surface of the fixed collar.

In testimony whereof I affix my signature in presence of two witnesses.

WILLIAM J. ELLIOTT.

Witnesses:
JAMES B. HASSON,
WILBUR L. SASSE.